United States Patent Office

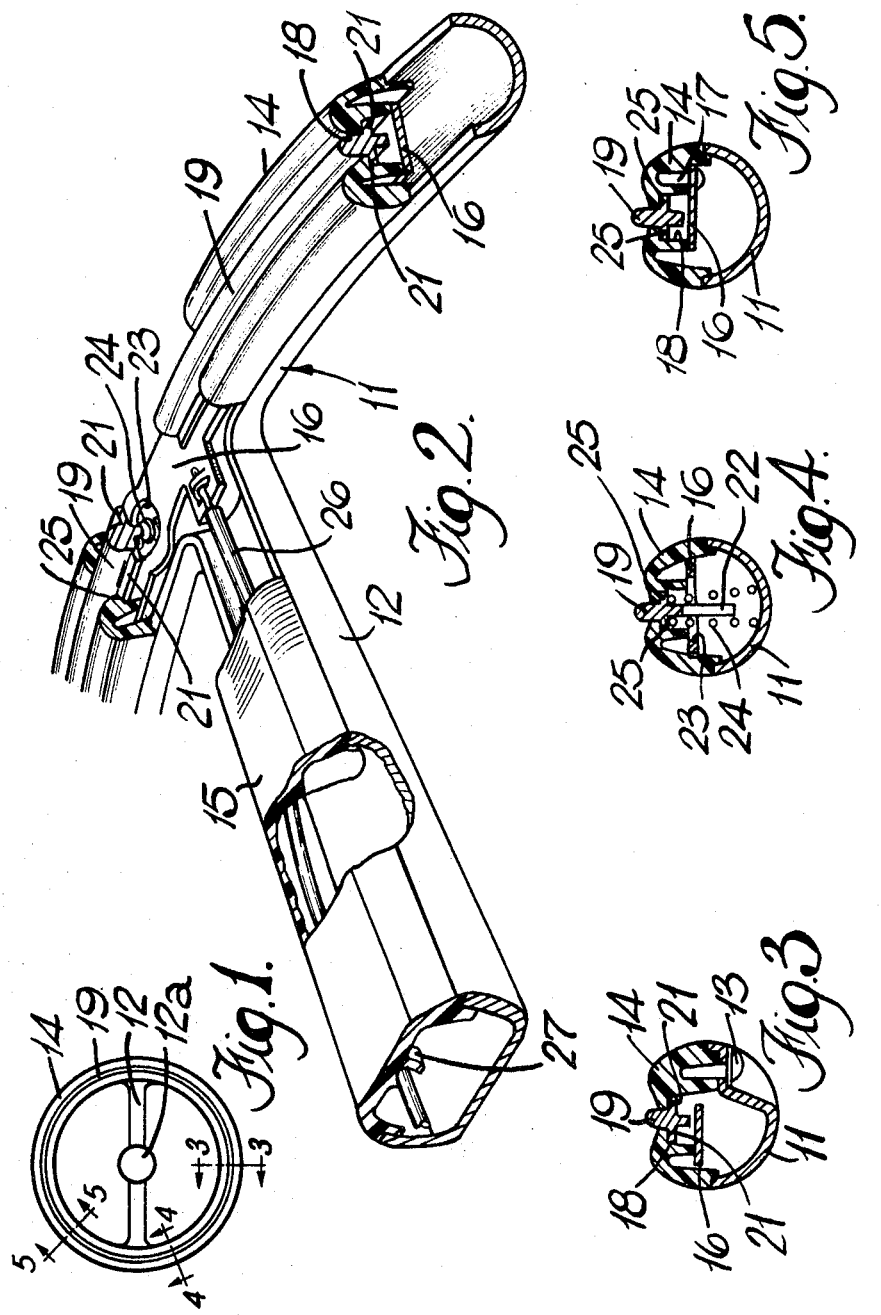

3,515,826
Patented June 2, 1970

---

3,515,826
STEERING WHEELS FOR ROAD VEHICLES INCORPORATING ELECTRICAL SWITCHES
Harold William Burton and Nigel Long, Birmingham, England, assignors to Joseph Lucas Industries Limited, Birmingham, England, a British company
Filed Dec. 3, 1968, Ser. No. 780,748
Claims priority, application Great Britain, Dec. 20, 1967, 57,865/67
Int. Cl. H01h 9/00
U.S. Cl. 200—61.57    3 Claims

ABSTRACT OF THE DISCLOSURE

A steering wheel for a road vehicle, comprises a conductive annular member having secured thereto at least one inwardly directed radial spoke, through which the wheel is mounted in use. Secured to the conductive annular member is an annular insulating moulding, and fixed to said moulding is a contact strip, the contact strip being insulated from the conductive annular member by said moulding. Slidably mounted in the moulding is a contact piece which is movable into engagement with the contact strip. Resilient means acts on the contact piece to urge the contact piece away from the contact strip, and the contact piece is electrically connected to the conductive annular member, which is intended for connection to earth. Thus, the contact piece forms with the contact strip, a switch which can be closed by moving the contact piece into engagement with the contact strip.

---

This invention relates to steering wheels for road vehicles.

A steering wheel according to the invention comprises, a conductive annular member having secured thereto at least one inwardly directed radial spoke, an annular insulating moulding secured to said annular member, a contact strip fixed to said moulding and insulated from the annular member by said moulding, a contact piece slidably mounted in said moulding for movement into engagement with said contact strip and resilient means urging said contact piece away from said contact strip, the contact piece being electrically connected to the annular member, which is intended for connection to earth, so that the contact piece forms with the contact strip a switch which can be closed by moving said contact piece into engagement with said contact strip.

The switch is preferably used to operate the horn of the vehicle.

One example of the invention is illustrated in the accompanying drawings wherein, FIG. 1 is a plan view of a steering wheel, FIG. 2 is a fragmentary perspective view of the steering wheel shown in FIG. 1 with parts thereof omitted for clarity, FIG. 3 is a sectional view on the line 3—3 in FIG. 1, FIG. 4 is a sectional view on the line 4—4 in FIG. 1, and FIG. 5 is a sectional view on the line 5—5 in FIG. 1.

Referring to the drawings the steering wheel includes an annular metal member 11, of semi-circular cross-section, having integral therewith a pair of generally diametrically opposite radially extending spokes 12 of similar cross section. At their inner ends the spokes 12 are secured to a hub 12a which is co-axial with the member 11 and which is secured to one end of the steering column of the vehicle in which the steering wheel is utilized.

Secured to the member 11 by screws 13 (FIG. 3) to constitute the rim of the wheel is an annular synthetic resin moulding 14 of generally semi-circular cross-section, and integral with the moulding 14 are a pair of moulded spokes 15 which are secured to the spokes 12 of the member 11. An annular, conductive, contact strip 16 is secured to the moulding 14 within the annular channel defined by the moulding 14 and the member 11, by screws 17 (FIG. 5) the strip 16 being insulated from the member 11 by the moulding 14. The moulding 14 is formed with an annular slot 18 within which is slidably mounted an annular conductive horn ring 19. The ring 19 includes a pair of oppositely directed outwardly extending flanges 21 and a plurality of spaced downwardly extending (as shown in the drawing) posts 22. The posts 22 (FIG. 4) extend through respective holes 23 in the strip 16 with clearance, and are surrounded by respective conductive compression springs 24 which act between the member 11 and the ring 19 to urge the ring 19 upwardly away from the strip 16. Moreover the springs 24 electrically interconnect the member 11 and the ring 19. The ring 19 is maintained in engagement with the moulding 14 by engagement of the flanges 21 with respective shoulders 25 of the moulding 14.

In use the member 11 and consequently the ring 19 are earthed through the steering column and the body of the vehicle and the strip 16 is connected through a lead 26 and the horn of the vehicle to one pole of the battery of the vehicle, the other pole of the battery being earthed. In order to energise the horn of the vehicle the ring 19 is depressed into the moulding 14 against the action of the springs 24 to engage the strip 16 and so complete the horn circuit of the vehicle, it being appreciated that the ring 19 will be returned to its original position, wherein the horn circuit is broken, by the springs 24 when the ring 19 is released.

The slot 18 of the moulding 14 divides the moulding 14 into two concentric annular parts and it will be noted that the drawings only illustrate how the outer of the two parts is secured to the member 11. However in practice, the inner part can be secured to the member 11 in a manner similar to that in which the outer part is secured to the member, the strip 16 being secured to both the inner and outer parts, or the inner and outer parts can be interconnected by integral bridge pieces which extend through slots in the ring 19.

The lead 26 which electrically connects the strip 16 to the horn of the vehicle extends along the channel defined between one of the spokes 12 and its respective moulded counterpart 15 and is held against vibration in use in a clip or clips 27 integral with the moulded spokes 15.

Having thus described our invention what we claim as new and desire to secure by Letters Patent is:

1. A steering wheel for a road vehicle comprising, a conductive annular member, at least one inwardly directed radial spoke secured to the annular member, an annular insulating moulding, means securing the annular insulating moulding to the conductive annular member, a contact strip, means securing the contact strip to said annular insulating moulding, said contact strip being insulated from the conductive annular member by the annular insulating moulding, a contact piece, means mounting the contact piece for sliding movement in the moulding into engagement with said contact strip, and at least a pair of angularly spaced conductive compression springs acting between said contact piece and said annular conductive member so as to urge said contact piece away from said contact strip, said conductive springs serving to electrically interconnect the contact piece and said conductive annular member, said conductive annular member being intended to be connected to earth, in use, so that the contact piece forms with the contact strip a switch which can be closed by moving the contact piece into engagement with the contact strip against the action of said conductive springs.

2. A steering wheel as claimed in claim 1 wherein said contact piece and said contact strip are annular.

3. A steering wheel as claimed in claim 1 wherein said moulding includes a portion which engages said spoke, said spoke and said portion of the moulding defining a channel along which a lead constituting an electrical connection to said contact strip, extends.

References Cited
UNITED STATES PATENTS

| | | | |
|---|---|---|---|
| 2,025,981 | 12/1935 | Getty | 200—61.57 |
| 2,943,164 | 6/1960 | Kniffin | 200—61.57 |
| 1,112,294 | 9/1914 | Kepler | 74—543 |

ROBERT K. SCHAEFER, Primary Examiner

M. GINSBURG, Assistant Examiner